(12) United States Patent
Feese et al.

(10) Patent No.: US 12,337,781 B2
(45) Date of Patent: Jun. 24, 2025

(54) OCCUPANT PROTECTION DEVICE FOR A VEHICLE, VEHICLE HAVING AT LEAST ONE OCCUPANT PROTECTION DEVICE, AND METHOD FOR OPERATING AN OCCUPANT PROTECTION DEVICE

(71) Applicant: Mercedes-Benz Group AG, Stuttgart (DE)

(72) Inventors: Jochen Feese, Sindelfingen (DE); Claus Geisler, Herrenberg (DE); Julien Richert, Sindelfingen (DE)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 18/573,340

(22) PCT Filed: Jun. 21, 2022

(86) PCT No.: PCT/EP2022/066916
§ 371 (c)(1),
(2) Date: Dec. 21, 2023

(87) PCT Pub. No.: WO2023/274793
PCT Pub. Date: Jan. 5, 2023

(65) Prior Publication Data
US 2024/0286570 A1    Aug. 29, 2024

(30) Foreign Application Priority Data
Jun. 28, 2021    (DE) .................... 10 2021 003 331.0

(51) Int. Cl.
*B60R 21/16* (2006.01)
*B60N 3/00* (2006.01)
(Continued)

(52) U.S. Cl.
CPC .............. *B60R 21/16* (2013.01); *B60N 3/001* (2013.01); *B60R 21/0134* (2013.01);
(Continued)

(58) Field of Classification Search
CPC ............ B60R 21/20; B60R 2021/2173; B60R 21/0134; B60R 21/015; B60R 21/01554; B60N 3/001; B60N 3/002; B60N 3/004
(Continued)

(56) References Cited

U.S. PATENT DOCUMENTS 4,159,127 A * 6/1979 Czernakowski ..... B60N 2/2839
280/751
4,190,288 A   2/1980 Korger
(Continued)

FOREIGN PATENT DOCUMENTS

DE    27 25 577 A1    12/1978
DE    199 56 894 C2    6/2001
(Continued)

OTHER PUBLICATIONS

English Translation of JP2021084491 (Year: 2021).*
(Continued)

*Primary Examiner* — Paul N Dickson
*Assistant Examiner* — Caitlin Anne Miller
(74) *Attorney, Agent, or Firm* — Crowell & Moring LLP (57) ABSTRACT

An occupant protection device of a vehicle includes a table that is assigned to a vehicle seat. The table is actively movable into an occupant protection position when a collision or a danger of a collision of the vehicle is recognized. In the occupant protection position, an upper body of an occupant of the vehicle seat is supported by the table against a displacement caused by a collision.

8 Claims, 4 Drawing Sheets

(51) Int. Cl.
*B60R 21/0134* (2006.01)
*B60R 21/015* (2006.01)
*B60R 21/237* (2006.01)

(52) U.S. Cl.
CPC .. *B60R 21/01512* (2014.10); *B60R 21/01554* (2014.10); *B60R 21/237* (2013.01)

(58) Field of Classification Search
USPC .................................. 280/735, 730.1, 728.2
See application file for complete search history.

(56) References Cited

U.S. PATENT DOCUMENTS

| | | | | |
|---|---|---|---|---|
| 5,800,012 | A * | 9/1998 | Ziegler | B60N 2/2839 |
| | | | | 297/181 |
| 10,232,815 | B1 * | 3/2019 | Dry | B60R 21/18 |
| 10,766,447 | B2 * | 9/2020 | Jung | B60R 21/205 |
| 11,084,444 | B2 * | 8/2021 | Richert | B60R 21/20 |
| 11,273,785 | B1 * | 3/2022 | Faruque | B60R 21/01554 |
| 11,577,680 | B1 * | 2/2023 | Faruque | B60N 3/002 |
| 11,590,914 | B1 * | 2/2023 | Llamazares Domper | |
| | | | | B60N 2/06 |
| 11,794,676 | B1 * | 10/2023 | Benqassmi | B60W 10/00 |
| 2019/0144121 | A1 * | 5/2019 | Young | B64D 11/06205 |
| | | | | 280/730.1 |
| 2020/0023801 | A1 * | 1/2020 | Takemura | B60N 3/002 |
| 2020/0122670 | A1 * | 4/2020 | Jung | B60R 21/20 |
| 2021/0094503 | A1 | 4/2021 | Farooq et al. | |
| 2022/0242323 | A1 * | 8/2022 | Bork | B60N 2/0244 |
| 2025/0026297 | A1 * | 1/2025 | Iwama | B60N 3/001 |

FOREIGN PATENT DOCUMENTS

| | | | |
|---|---|---|---|
| DE | 10 2019 210 001 A1 | | 1/2021 |
| EP | 3 640 092 A1 | | 4/2020 |
| JP | 50-15235 A | | 2/1975 |
| JP | 60-92170 A | | 5/1985 |
| JP | 2009-208566 A | | 9/2009 |
| JP | 2018150005 A | * | 9/2018 |
| JP | 2021-79773 A | | 5/2021 |
| JP | 2021084491 A | * | 6/2021 |
| WO | WO 2018/167899 A1 | | 9/2018 |

OTHER PUBLICATIONS

International Search Report (PCT/ISA/210) issued in PCT Application No. PCT/EP2022/066916 dated Sep. 15, 2022 (2 pages).
German-language German Office Action issued in German Application No. 10 2021 003 331.0 dated Mar. 2, 2022 (7 pages).
German-language European Office Action issued in European Application No. 22 734 596.4-1009 dated Apr. 26, 2024 (7 pages).
Japanese-language Office Action issued in Japanese Application No. 2023-580347 dated Feb. 4, 2025 (5 pages).

* cited by examiner

OCCUPANT PROTECTION DEVICE FOR A VEHICLE, VEHICLE HAVING AT LEAST ONE OCCUPANT PROTECTION DEVICE, AND METHOD FOR OPERATING AN OCCUPANT PROTECTION DEVICE

BACKGROUND AND SUMMARY OF THE INVENTION

The invention relates to an occupant protection device for a vehicle, to a vehicle having at least one occupant protection device and to a method for operating an occupant protection device.

An airbag system for a vehicle table is known, as is described in EP 3 640 092 A1, from the prior art. The system comprises a table arranged in front of a passenger and an airbag cushion which is provided in the interior of the table. The airbag cushion expands, while it is triggered in a state in which a first end portion of the airbag cushion is fixed to an inner portion of a table edge, so that a second end portion can protrude over the table and can cover a top of the table. The airbag cushion also contains a base region that faces the table and is positioned at a spacing from the top side of the table while the airbag cushion is triggered. A gas generator supplies the airbag cushion with gas to trigger the airbag cushion.

The object of the invention is to disclose an occupant protection device for a vehicle that is improved in relation to the prior art, a vehicle that is improved in relation to the prior art and a method for operating an occupant protection device that is improved in relation to the prior art.

An occupant protection device for a vehicle comprises at least one table assigned to a vehicle seat. In particular, this table can be moved manually and/or electrically, in particular via an electric motor, for example from a stowed position into a table usage position, in which it can be used for an occupant of the vehicle sitting on the vehicle seat, and back again. The table is thus in particular arranged in the region of the vehicle seat, in the stowed position for example on or in the vehicle seat or in front of the vehicle seat or behind the vehicle seat or to the side next to the vehicle seat or under the vehicle seat or above the vehicle seat, and in the table usage position for example in front of and/or to the side next to and/or above the vehicle seat, in particular in front of and/or to the side next to the occupant in the vehicle seat. The table is for example designed as a folding table.

According to the invention, this at least one table can be moved, in particular actively, i.e., in particular driven electrically, in particular via an electric motor, and/or pneumatically and/or hydraulically and/or pyrotechnically, in particular automatically, into at least one occupant protection position, in particular from the table usage position and/or from the stowed position, when a collision and/or a danger of the vehicle colliding is recognized, in which occupant protection position the table supports at least one body portion, in particular an upper body, of an occupant against a displacement caused by a collision and/or forms a support surface for at least one airbag which unfolds from another vehicle part, i.e., not from the table. This support surface is in particular provided to steer, guide and/or brace the airbag while it unfolds and/or in particular to support the unfolded airbag.

A vehicle according to the invention comprises such an occupant protection device. For example, the occupant protection device can have several such tables, for example such a table is respectively assigned to several or all the vehicle seats of the vehicle, for example at least to back seats and/or to a front passenger seat.

In a method according to the invention for operating the occupant protection device, the at least one table is moved actively, i.e., in particular driven electrically, in particular via an electric motor, and/or pneumatically and/or hydraulically and/or pyrotechnically, in particular automatically, into an occupant protection position, in particular from the table usage position and/or from the stowed position when a collision or a danger of the vehicle colliding is recognized, in which occupant protection position the table supports at least one body portion, in particular an upper body, of an occupant against a displacement caused by a collision and/or forms a support surface for at least one airbag which unfolds from another vehicle part, i.e., not from the table. This support surface is in particular provided to steer, guide and/or brace the airbag while it unfolds and/or in particular to support the unfolded airbag.

The electric, in particular via an electric motor, and/or pneumatic and/or hydraulic drive enables in particular a reversible movement of the table. This is in particular advantageous when a collision danger is recognized, whereby there is still a possibility of preventing the collision. The pyrotechnic movement is particularly fast, and is thus in particular suitable for a recognized collision of the vehicle which is already occurring.

The table comprises for example at least one input unit and/or at least one display unit and/or at least one acoustic output unit. The input unit is for example a keyboard, a tactile display or a projection with gesture recognition.

Via the solution described, a table, which can be used by the occupant for example as a work table and/or storage surface and/or input and/or output unit, for example as a keyboard and/or operating unit, is optimally positioned to protect the occupant when a collision or a danger of a collision is recognized. The occupant protection position, in which the table supports at least one body portion, in particular the upper body, of the occupant against a displacement caused by a collision, is for example a position on a front of the occupant, in particular on a front of the upper body of the occupant, in particular on their chest, i.e., the table is correspondingly moved towards the occupant, in particular towards their upper body, in particular towards their chest, in particular positioned resting against the latter. The occupant, in particular their upper body, is thus advantageously supported at the front by the table and at the back by a seat back of the vehicle seat, and is correspondingly held. Via this positioning of the table in front of the upper body, in particular in front of the chest, the occupant can be restrained over an extensive area, whereby a load on the chest cavity of the occupant is reduced.

Via the solution described, activities, in particular secondary activities, in particular such as require an input unit, are facilitated without reducing the occupant safety and driving safety.

In particular, the occupant protection device also comprises the at least one airbag. Functions of the table and of the airbag which are optimized in relation to each other are thus facilitated. The at least one airbag can, for example, be arranged in an instrument panel, a dashboard and/or a cockpit of the vehicle, and unfold from the latter, or be arranged in a seatbelt and unfold from the latter, or be arranged in the vehicle seat, for example to the side in a seat cushion or in a seat back or in an armrest, and unfold from the latter, or be arranged in a central console of the vehicle and unfold from the latter, or be arranged in an interior cladding, for example side cladding or roof cladding of the vehicle, and unfold from the latter. There can also be several airbags arranged in different vehicle parts and thus at different positions in the vehicle, which, in particular dependent on the present circumstances, are unfolded when a collision or a danger of a collision is recognized and are supported by the table in its corresponding occupant protection position.

The occupant protection position, into which the table can be or is moved when a collision or a danger of a collision is recognized, is for example dependent on a type of recognized collision or collision danger, e.g., front, side or rear collision or danger of the latter, and/or on a sitting position of the occupant and/or on a seat adjustment of the vehicle seat and/or on a fastening state of a seatbelt assigned to the vehicle seat, i.e., whether or not the latter has been correctly fastened by the occupant, in particular whether a seatbelt buckle is engaged or not, and/or on an alignment of the occupant and/or of the vehicle seat relative to the at least one airbag to be supported. An occupant protection position for the table that is optimized to these respective present circumstances is thus enabled, into which the table can then be or is then moved.

The table can in particular be rotated around at least one axis of rotation, for example around several axes of rotation, and/or can be pivoted around at least one axis, for example around several axes, and/or can be displaced along at least one axis, for example along several axes, so as to be actively moved into the occupant protection position. Advantageously, a combination of several of these movement possibilities or of all specified movement possibilities is provided so that the table can be moved into a plurality of possible occupant protection positions. This enables an occupant protection position that is optimized to the respective present circumstances when a collision or a collision danger is recognized and the movement of the table into this occupant protection position.

In a possible embodiment, the table is coupled with the central console of the vehicle. Secure anchoring of the table in the vehicle is thus ensured, easy stowing of the table in the stowed position is facilitated, an optimized table usage position for the table is facilitated and, in particular, a plurality of possible occupant protection positions are facilitated for the table, into which occupant protection positions the table can then be moved depending on respective present circumstances when a collision or a collision danger is recognized.

In a possible embodiment, the table has at least one protection system which can be inflated, which is in particular designed as a table airbag and is thus described as a table airbag in the following. The table airbag can be unfolded when a collision or when a danger of the vehicle colliding is recognized, in particular via activation, in particular ignition, of at least one gas generator. For example, the table can also have several such table airbags, for example a table airbag which unfolds on a top side of the table, and a further table airbag which unfolds on an underside of the table and then for example serves as a knee airbag to protect the pelvis and/or legs, in particular thighs and/or knees of the occupant. By moving the table into the occupant protection position, an optimized alignment of this at least one or respective table airbag is facilitated. It can for example be provided that the table, in particular the at least one input unit, output unit and/or display unit, is provided with an opening, for example a tearing flap, as in airbags, or which can be released mechanically and/or electrically, via which the table airbag can unfold, in particular in the direction of the occupant, upwards or downwards, downwards in particular when the table is correspondingly positioned.

For example, only one table airbag can also be provided, which is then correspondingly aligned by moving the table into the occupant protection position adjusted to the respective present circumstances. For example, depending on the present circumstances when a collision or a collision danger is recognized, it can then be provided that this table airbag unfolds on a surface forming a top of the table, e.g., upwards and/or in the direction of the occupant, to protect an upper body and/or head of the occupant, or by correspondingly moving, in particular rotating the table, the table airbag unfolds on a surface forming an underside of the table to protect the pelvis and/or the legs, in particular thighs and/or knees, of the occupant. In this manner, if an increased load on the knees is expected when a collision or a collision danger is recognized, in particular without an additional need to particularly protect the upper body, the table can be moved, in particular rotated, into such an occupant protection position that the table airbag then serves as a knee airbag, also described as a "knee bag". For example, a top of the table which is then free can simultaneously form the support surface for the at least one airbag unfolding from the other vehicle part, whereby the head and/or the upper body of the occupant is simultaneously protected if this protection is required.

For example, the occupant protection device comprises a collision sensor for recognizing a collision and/or collision danger, in particular also for recognizing the kind of collision or collision danger, for example a front, side or rear collision or the danger of the latter, and/or an occupant position sensor for recognizing a sitting position of the occupant, and/or a seat adjustment sensor for recognizing a seat adjustment of the vehicle seat and/or an alignment sensor for recognizing an alignment of the occupant and/or of the vehicle seat relative to the at least one airbag to be supported.

The collision sensor can for example have at least one camera sensor, lidar sensor, ultrasound sensor, radar sensor, force sensor, deformation sensor, movement sensor and/or acceleration sensor. Several sensors of the respective sensor type can also be provided. A camera sensor, lidar sensor, ultrasound sensor and/or radar sensor are in particular a component of an environment recording sensor for recording an environment outside of the vehicle.

The occupant position sensor can for example have at least one camera sensor, lidar sensor, ultrasound sensor, radar sensor, force sensor, deformation sensor, movement sensor, acceleration sensor, weight sensor, contact sensor, in particular body contact sensor, and/or seatbelt sensor. These sensors are in particular a component of an interior monitoring system of the vehicle. Several sensors of the respective sensor type can also be provided. The respective at least one force sensor, deformation sensor, movement sensor, acceleration sensor, weight sensor and/or contact sensor, in particular body contact sensor, can for example be arranged on or in the vehicle seat, for example as a component of a seat occupancy recognition system. The at least one seatbelt sensor serves in particular to record the fastening state of the seatbelt assigned to the vehicle seat, i.e., whether the occupant has fastened the latter correctly or not, in particular whether a seatbelt buckle is engaged or not. For example, the seatbelt sensor is arranged in the seatbelt buckle. The at least one contact sensor can for example be arranged in a steering wheel or on or in the table. The respective at least one camera sensor, lidar sensor, ultrasound sensor and/or radar sensor is in particular arranged in the vehicle such that its recording region comprises the vehicle seat and the occupant if the latter sits in the former, in particular in every possible sitting position, seat adjustment and alignment.

The seat adjustment sensor can for example comprise one sensor or several sensors in the vehicle seat, in particular in its adjustment mechanism, wherein this seat adjustment sensor can also be formed by the adjustment mechanism itself.

The alignment sensor can be partially or completely identical to the occupant position sensor and/or the seat adjustment sensor, i.e., use one or several or all of the sensors specified there or have the same sensors. In this way, an occupant protection position for the table which is optimized corresponding to the respective present circumstances is enabled.

Via the solution described, it is for example made possible to unfold the table airbag depending on the present circumstances when a collision or a collision danger is recognized, whereby the table is moved into the correspondingly optimized occupant protection position to optimally position the table airbag. For example, the table is moved, in particular rotated, when an increased load on the knees is expected, in particular without an additional need to particularly protect the upper body, such that the table airbag serves as a knee airbag.

As an alternative, depending on the present circumstances, for example if, due to a corresponding seat adjustment, the occupant is in a so-called relaxed position, i.e., in a relaxed sitting position, i.e., with a vehicle seat for example tilted significantly backwards and for example additionally displaced backwards, it can for example be recognized that airbags in other vehicle parts cannot reach the occupant, such that the table is moved into such an occupant protection position that it supports at least one body portion, in particular the upper body, of the occupant against a displacement caused by a collision. Here too, the table airbag can for example additionally be unfolded, in particular in the direction of the occupant, to avoid a hard impact on the table and to obtain lower deceleration values for the occupant.

As an alternative, depending on the present circumstances, in particular if it is recognized that the sitting position of the occupant is already optimal for at least one airbag arranged in another vehicle part, the table can for example be moved into such an occupant protection position that it forms a support surface for this airbag, and thus steers, guides and/or braces, and/or, in particular in the unfolded state, supports the latter optimally while it unfolds.

Exemplary embodiments of the invention are explained in more detail in the following with reference to drawings.

DETAILED DESCRIPTION OF THE DRAWINGS

Parts corresponding to one another are provided with the same reference numerals in all figures.

With reference to FIGS. 1 to 11, an occupant protection device 1 for a vehicle 2, a vehicle 2 having at least one such occupant protection device 1 and a method for operating such an occupant protection device 1 are described in the following. The occupant protection device 1 comprises at least one table 4 assigned to a vehicle seat 3 of the vehicle 2. For example, the occupant protection device 1 can have several such tables 4, for example such a table 4 is respectively assigned to several or all the vehicle seats 3 of the vehicle 2, for example at least to back seats and/or to a front passenger seat.

Figure 1:
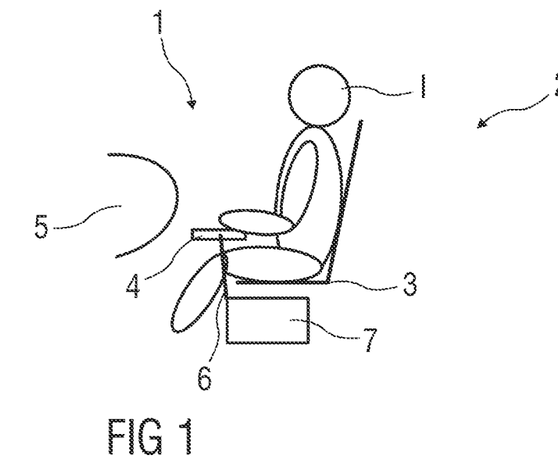
FIG. 1 schematically shows a vehicle with an occupant in an upright sitting position.
Figure 2:
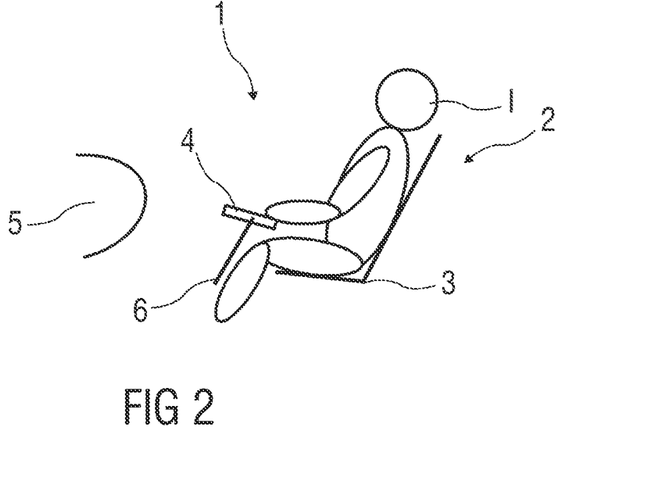
FIG. 2 schematically shows the vehicle with the occupant in a relaxed sitting position.
Figure 7:
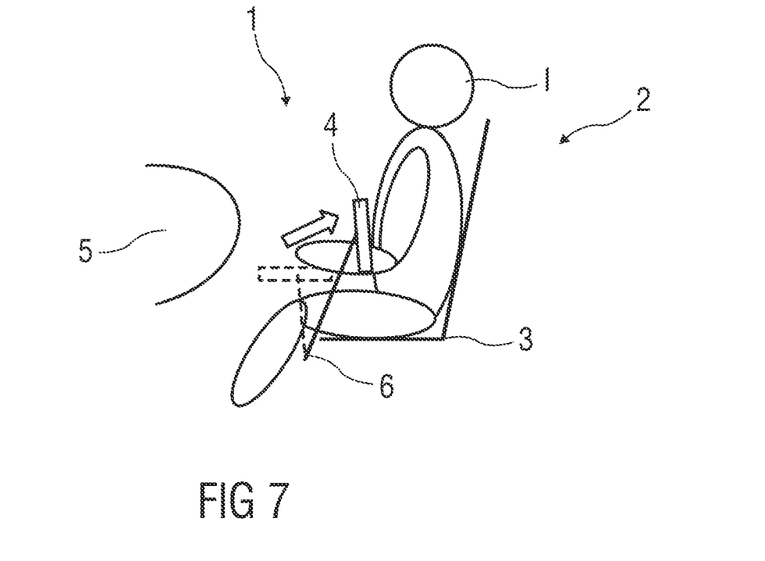
FIG. 7 schematically shows the vehicle with the occupant in the upright sitting position and the table moved into an occupant protection position to support at least one body portion of the occupant against a displacement caused by a collision.
Figure 8:
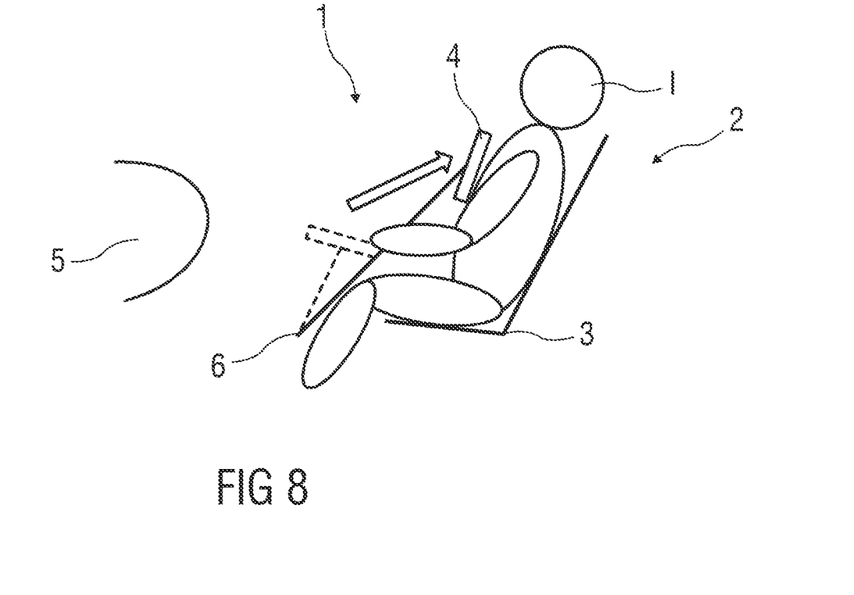
FIG. 8 schematically shows the vehicle with the occupant in the relaxed sitting position and the table moved into an occupant protection position to support at least one body portion of the occupant against a displacement caused by a collision.

The table 4 can for example be moved, for example manually and/or electrically, in particular via an electric motor, from a stowed position into a respective table usage position depicted in FIGS. 1 and 2. The table usage position is for example dependent on a sitting position of an occupant I sitting in the vehicle seat 3, as is shown in FIGS. 1 and 2. In FIG. 1, the occupant I is in an upright sitting position, also described as a standard sitting position, and thus relatively close to a cockpit 5, also described as an instrument panel, of the vehicle 2, and in FIG. 2 is in a so-called relaxed position, i.e., in a relaxed sitting position, in which for example the vehicle seat 3 is displaced backwards and/or the vehicle seat 3 or at least a seat back of the vehicle 3 is tilted backwards and the occupant I is thus further away from the cockpit 5. In FIGS. 7 and 8, the table usage position is respectively depicted by dashes.

The table 4 is for example, in particular via a table holder 6, coupled with a central console 7 of the vehicle 2. The stowed position is for example on or in this central console 7. For the sake of clarity, the central console 7 is only depicted in FIG. 1, and here only in an exemplary and schematically significantly simplified manner.

The table 4 is for example designed as a folding table.

Providing such a table 4 for the vehicle seat 3 takes account of the fact in particular that there is an increasing need to work while the vehicle 2 is driving. This relates, for example, to a front seat passenger or a passenger on a back seat of the vehicle 2, and when the vehicle 2 is driving automatically, in particular highly automatically or autonomously, also to a vehicle driver of the vehicle 2.

For example, the occupant I can for this purpose use the, in particular fold-out, table 4. For example, the table 4 has at least one input unit and/or at least one display unit and/or at least one acoustic output unit for this purpose. The input unit is for example a keyboard, a tactile display or a projection with gesture recognition.

It is problematic in the case of such a table 4 that it represents a possible danger for occupant safety in an accident situation i.e., in a collision of the vehicle 2. In addition, in the relaxed, i.e., reclined, sitting position, a protection effect of conventional restraint systems, in particular of a frontal airbag, is increasingly reduced.

To solve these problems with regard to occupant protection, it is provided that the at least one table 4 can be moved, in particular actively, i.e., in particular driven electrically, in particular via an electric motor, and/or pneumatically and/or hydraulically and/or pyrotechnically, in particular automatically, into at least one occupant protection position, in particular from the table usage position and/or from the stowed position when a collision and/or when the vehicle 2 is in danger of colliding is recognized, in which occupant protection position the table supports at least one body portion, in particular an upper body, of the occupant I against a displacement caused by a collision and/or forms a support surface for at least one airbag 8 which unfolds from another vehicle part. This support surface is in particular provided to steer, guide and/or brace the airbag 8 while it unfolds and/or in particular to support the unfolded airbag 8. In particular, the occupant protection device 1 also comprises the at least one airbag 8 or several such airbags 8.

The electric, in particular via an electric motor, and/or pneumatic and/or hydraulic drive enables in particular a reversible movement of the table 4. This is in particular advantageous when a collision danger is recognized, whereby there is still a possibility of preventing the collision. The pyrotechnic movement is particularly fast, and is thus in particular suitable for a recognized collision of the vehicle 2 which is already occurring.

Figure 3:
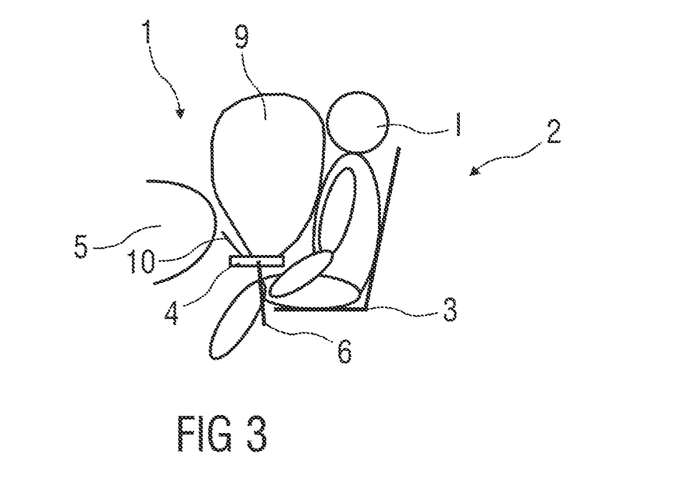
FIG. 3 schematically shows the vehicle with the occupant in the upright sitting position and a table airbag unfolded upwards.

As an alternative or in addition to this movement into the occupant protection position, it can for example be provided that the table 4 has at least one protection system which can be inflated, described in the following as a table airbag 9. The table airbag 9 can be unfolded when a collision or a danger of the vehicle 2 colliding is recognized, in particular by activating, in particular igniting, at least one gas generator, as is shown in FIG. 3 for the upright sitting position and in FIG. 4 for the relaxed sitting position. The table airbag 9 is advantageously integrated into the table 4 such that it is moved together with the table 4. It is thus made possible both to protect the occupant I from hard contact with the table 4 and to brace the occupant I, who has moved back into the relaxed position, early on.

Figure 4:
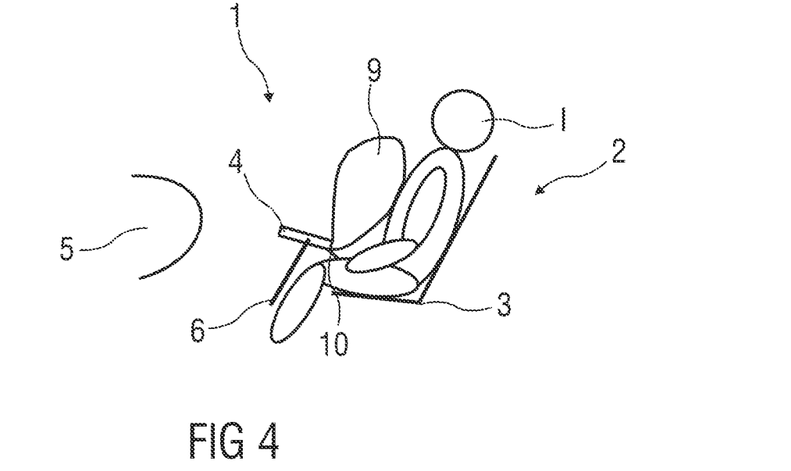
FIG. 4 schematically shows the vehicle with the occupant in the relaxed sitting position and the table airbag unfolded upwards.

To release the unfolding of the table airbag 9, the table 4, in particular the at least one input unit, output unit and/or display unit, is provided with an opening, e.g., a tear flap as in airbag systems or which can be released mechanically and/or electrically, via which the table airbag 9 can unfold, in particular in the direction of the occupant I and/or upwards. In FIGS. 3 and 4, an opened airbag flap 10 is depicted, which closes the opening in the closed state when the table airbag 9 is not unfolded.

Figure 5:
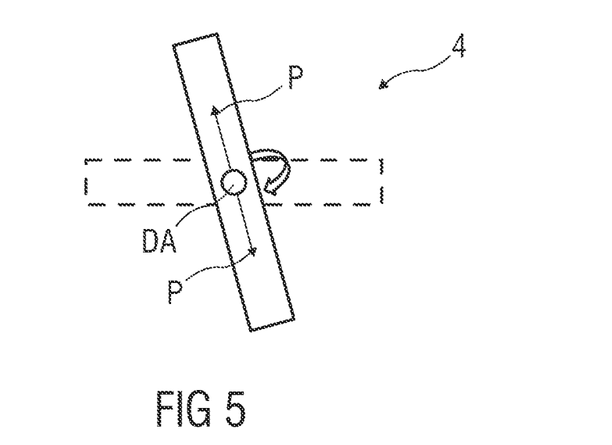
FIG. 5 schematically shows a table of the vehicle in two rotation positions around an axis of rotation.

As already mentioned above, the at least one table 4 can in particular be moved, in particular actively, i.e., in particular electrically, in particular driven via an electric motor, and/or pneumatically and/or hydraulically and/or pyrotechnically, in particular automatically, into at least one occupant protection position, in particular out of the table usage position and/or the stowed position when a collision and/or a danger of the vehicle 2 colliding is recognized. For this purpose, said table can for example be rotated around at least one axis of rotation DA, in particular relative to its table holder 6, as shown in FIG. 5, wherein the table 4 is depicted here in a rotated position and additionally by dashes in a position before rotation.

As an alternative or in addition, the table 4 can for example be pivoted around at least one axis, in particular relative to its table holder 6 or together with its table holder 6, and/or, as depicted by displacement arrows P, can be displaced, i.e., can be displaced translationally, along at least one axis, in particular relative to its table holder 6. Advantageously, a combination of several of these movement possibilities or of all the specified movement possibilities is provided. As an alternative or in addition, it can for example also be provided that the table 4 can be rotated, pivoted and/or displaced by means of its table holder 6 in the manner described, can be displaced for example by lengthening or shortening the table holder 6, can be pivoted for example by pivoting the table holder 6. It is in particular made possible for the at least one table airbag 9 and/or the at least one airbag 8 arranged in the other vehicle part to be supported optimally on the table 4 and/or for the table 4 to support at least one body portion, in particular the upper body, of the occupant I against a displacement caused by a collision.

Figure 6:
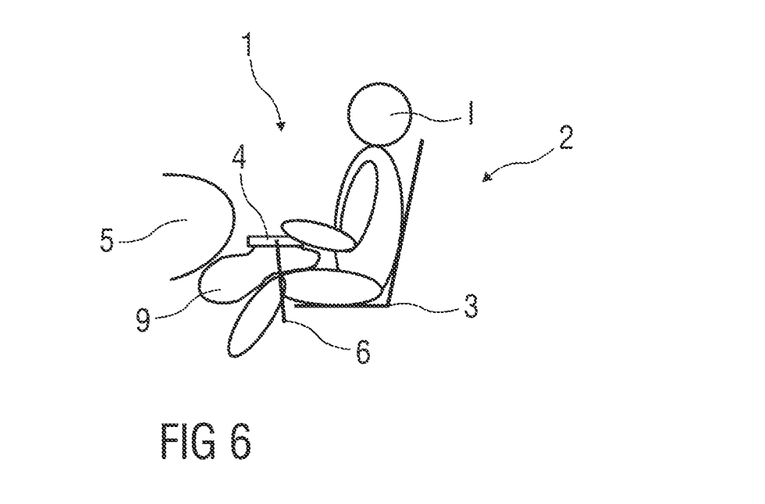
FIG. 6 schematically shows the vehicle with the occupant in the upright sitting position and a table airbag unfolded downwards.

As an alternative or in addition, it can for example be provided that the table airbag 9 unfolds on an underside of the table 4 and then serves for example as a knee airbag for protecting the pelvis and/or legs, in particular thighs and/or knees, of the occupant I, as shown in FIG. 6, in particular to better fix the pelvis and thighs and/or to protect the knees from a hard impact on the cockpit 5. For example, the table 4 can have several such table airbags 9, wherein for example one can unfold upwards and one downwards, or in a particularly advantageous embodiment, the table 4 has only one table airbag 9, which is then correspondingly aligned via the described movement of the table 4 into the occupant protection position adjusted to the respective present circumstances.

For example, depending on the present circumstances when a collision or a collision danger is recognized, it can then be provided that this table airbag 9 unfolds on a surface forming a top of the table 4, e.g., upwards and/or in the direction of the occupant I, to protect the upper body and/or head of the occupant I, as shown in FIGS. 3 and 4, or by correspondingly moving, in particular rotating, the table 4, that this table airbag 9 unfolds on a surface then forming an underside of the table 4 to protect the pelvis and/or the legs, in particular the thighs and/or knees, of the occupant I, as shown in FIG. 6, in particular in order better to fix the pelvis and thighs and/or to protect the knees from a hard impact on the cockpit 5.

As already described, it is advantageously provided that the at least one table 4 can be moved, in particular actively, i.e., in particular driven electrically, in particular via an electric motor, and/or pneumatically and/or hydraulically and/or pyrotechnically, in particular automatically, into at least one occupant protection position, in particular from the table usage position and/or from the stowed position when a collision and/or when the vehicle 2 is in danger of colliding is recognized, in which occupant protection position the table supports at least one body portion, in particular the upper body, of the occupant I against a displacement caused by a collision. This is depicted in an exemplary manner for the upright sitting position in FIG. 7, and in FIG. 8 for the relaxed sitting position of the occupant I. This is in particular advantageous when a collision danger is recognized, wherein the table 4 is preventatively, also described as "pre-safely", moved into this occupant protection position shortly before the collision. Via this positioning of the table 4 in front of the upper body, in particular in front of the chest, the occupant can be restrained over an extensive area, whereby a load on the chest cavity of the occupant I is reduced. For example, it can additionally be provided that the table airbag 9 unfolds in the direction of the occupant I.

Figure 9:
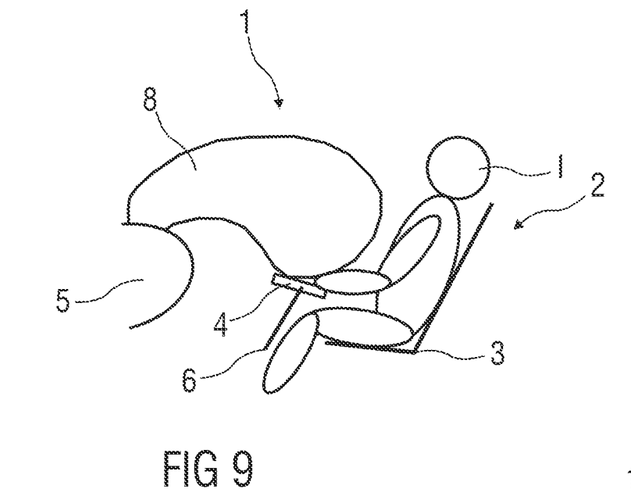
FIG. 9 schematically shows the vehicle with the occupant in the relaxed sitting position and the table moved into an occupant protection position to support an airbag unfolding out of another vehicle part.
Figure 10:
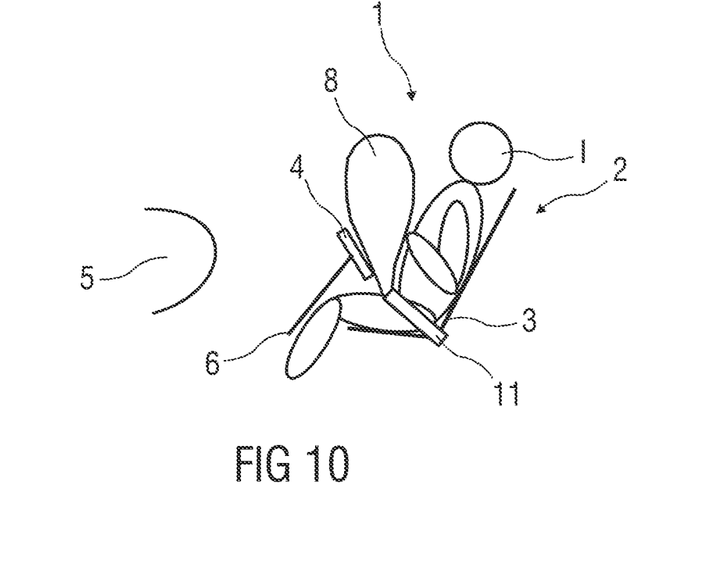
FIG. 10 schematically shows the vehicle with the occupant in the relaxed sitting position and the table moved into an occupant protection position to support a further airbag unfolding from another vehicle part.

As already described, it is advantageously provided that the at least one table 4 can be moved, in particular actively, i.e., in particular driven electrically, in particular via an electric motor, and/or pneumatically and/or hydraulically and/or pyrotechnically, in particular automatically, into at least one occupant protection position, in particular from the table usage position and/or from the stowed position when a collision and/or when the vehicle 2 is in danger of colliding is recognized, in which occupant protection position the table forms a support surface for the at least one airbag 8 unfolding from another vehicle part. This support surface is in particular provided to steer, guide and/or brace the airbag 8 while it unfolds and/or in particular to support the unfolding airbag 8. In particular, the occupant protection device 1 also comprises the at least one airbag 8. Examples for this embodiment are depicted in FIGS. 9 and 10. FIG. 9 shows an airbag 8, which is also described as a frontal airbag, unfolding from the further vehicle part designed as a cockpit 5, and FIG. 10 shows an airbag 8 unfolding from a vehicle part, which is designed as a seatbelt 11 assigned to the vehicle seat 3. Such an airbag 8 is also described as a belt bag.

As an alternative or in addition, the table 4 can for example also, in particular preventatively, be moved in the manner described, i.e., as early as when a collision danger is recognized, into a safety position in which the table 4 increases a protective effect of one or several other present safety components of the vehicle 2.

The occupant protection position, in which the table 4 can be or is moved when a collision or a collision danger is recognized, is for example dependent on a type of recognized collision or collision danger, e.g., front, side or rear collision or danger of the latter, and/or on a sitting position of the occupant I and/or on a seat adjustment of the vehicle seat 3 and/or on a fastening state of the seatbelt 11 assigned to the vehicle seat 3, i.e., whether or not the latter has been correctly fastened by the occupant I, in particular whether a seatbelt buckle is engaged or not, and/or on an alignment of the occupant I and/or of the vehicle seat 3 relative to the at least one airbag 8 to be supported.

Figure 11:
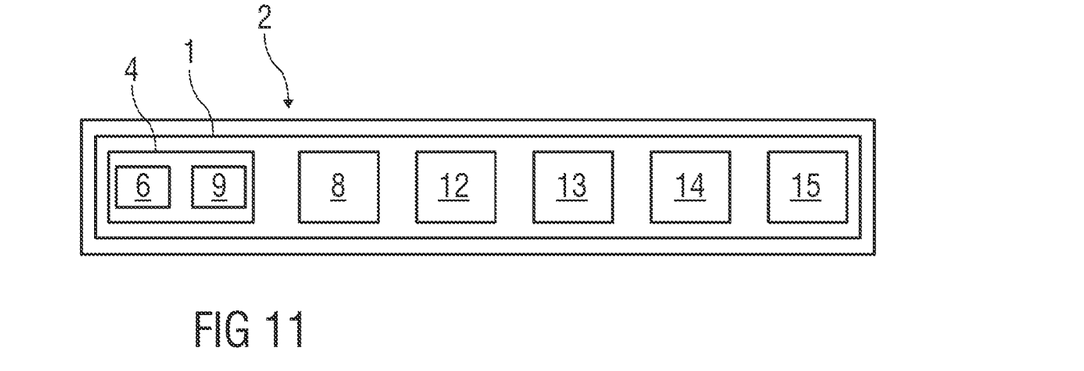
FIG. 11 schematically shows the vehicle having an occupant protection device.

FIG. 11 shows a schematically significantly simplified depiction of the vehicle 2 having the occupant protection device 1. In the depicted example, the occupant protection device 1 comprises the table 4, for example with its table holder 6 and for example with its table airbag 9, for example the at least one airbag 8 which unfolds from another vehicle part, and for example a collision sensor 12 for recognizing a collision and/or collision danger, in particular also for recognizing the type of collision or collision danger, for example a front, side or rear collision or the danger of the latter, and/or an occupant position sensor 13 for recognizing a sitting position of the occupant I, and/or a seat adjustment sensor 14 for recognizing a seat adjustment of the vehicle seat 3 and/or an alignment sensor 15 for recognizing an alignment of the occupant I and/or of the vehicle seat 3 relative to the at least one airbag 8 to be supported.

The collision sensor 12 can for example have at least one camera sensor, lidar sensor, ultrasound sensor, radar sensor, force sensor, deformation sensor, movement sensor and/or acceleration sensor. Several sensors of the respective sensor type can also be provided. A camera sensor, lidar sensor, ultrasound sensor and/or radar sensor are in particular a component of an environment recording sensor for recording an environment outside of the vehicle 2.

The occupant position sensor 13 can for example have at least one camera sensor, lidar sensor, ultrasound sensor, radar sensor, force sensor, deformation sensor, movement sensor, acceleration sensor, weight sensor, contact sensor, in particular body contact sensor and/or seatbelt sensor. These sensors are in particular a component of an interior monitoring system of the vehicle 2. Several sensors of the respective sensor type can also be provided. The respective at least one force sensor, deformation sensor, movement sensor, acceleration sensor, weight sensor and/or contact sensor, in particular body contact sensor, can for example be arranged on or in the vehicle seat 3, for example as a component of a seat occupancy recognition system. The at least one seatbelt sensor serves in particular to record the fastening state of the seatbelt 11 assigned to the vehicle seat 3, i.e., whether or not the occupant I has fastened the latter correctly, in particular whether a seatbelt buckle is engaged or not. For example, the seatbelt sensor is arranged in the seatbelt buckle. The at least one contact sensor can for example be arranged in a steering wheel or on or in the table 4. The respective at least one camera sensor, lidar sensor, ultrasound sensor and/or radar sensor is in particular arranged in the vehicle 2 such that its recording region comprises the vehicle seat 3 and the occupant I if the latter sits in the former, in particular in every possible sitting position, seat adjustment and alignment.

The seat adjustment sensor 14 can for example comprise one sensor or several sensors in the vehicle seat 3, in particular in its adjustment mechanism, wherein this seat adjustment sensor 14 can also be formed by the adjustment mechanism itself.

The alignment sensor 15 can be partially or completely identical with the occupant position sensor 13 and/or the seat adjustment sensor 14, i.e., use one or several or all of the sensors specified there or have the same sensors.

LIST OF REFERENCE CHARACTERS 1 occupant protection device
2 vehicle
3 vehicle seat
4 table
5 cockpit
6 table holder
7 central console
8 airbag
9 table airbag
10 airbag flap
11 seatbelt
12 collision sensor
13 occupant position sensor
14 seat adjustment sensor
15 alignment sensor
DA axis of rotation
I occupant
P displacement arrow

The invention claimed is:

1. An occupant protection device (1) of a vehicle (2), comprising:
   a table (4) assigned to a vehicle seat (3);
   wherein the table (4) is coupled via a table holder (6) with a central console (7) of the vehicle (2), wherein in a stowed position of the table (4) the table (4) is stowed on or in the central console (7), and wherein the table (4) is actively movable toward an upper body of an occupant (I) of the vehicle seat (3) and is positioned in front of the upper body of the occupant (I) of the vehicle seat (3) in an occupant protection position when a collision or a danger of a collision of the vehicle (2) is recognized;
   wherein in the occupant protection position the upper body of the occupant (I) of the vehicle seat (3) is supported by the table (4) against a displacement caused by a collision.

2. The occupant protection device (1) according to claim 1, wherein the occupant protection position is dependent on:
   a type of collision or danger of collision; and/or
   a sitting position of the occupant (I); and/or
   a seat adjustment of the vehicle seat (3); and/or
   a fastening state of a seatbelt (11) assigned to the vehicle seat (3); and/or
   an alignment of the occupant (I) and/or of the vehicle seat relative to an airbag (8) which is unfoldable out of a vehicle part.

3. The occupant protection device (1) according to claim 1, wherein the table (4) is actively movable electrically, pneumatically, hydraulically, and/or pyrotechnically into the occupant protection position.

4. The occupant protection device (1) according to claim 1, wherein, for actively moving the table (4) into the occupant protection position, the table (4) is rotatable around at least one axis of rotation (DA) and/or is pivotable around at least one axis and/or is displaceable along at least one axis.

5. The occupant protection device (1) according to claim 1, wherein the table (4) has a table airbag (9) which is unfoldable when the collision or the danger of the collision of the vehicle (2) is recognized.

6. The occupant protection device (1) according to claim 1, further comprising:
   a collision sensor (12) for recognizing the collision or the danger of the collision of the vehicle (2); and/or
   an occupant position sensor (13) for recognizing a sitting position of the occupant (I); and/or
   a seat adjustment sensor (14) for recognizing a seat adjustment of the vehicle seat (3); and/or
   an alignment sensor (15) for recognizing an alignment of the occupant (I) and/or of the vehicle seat (3) relative to an airbag (8) which is unfoldable out of a vehicle part.

7. A vehicle (2), comprising:
   the occupant protection device (1) according to claim 1.

8. A method for operating the occupant protection device (1) according to claim 1, comprising the steps of:
   actively moving the table (4) into the occupant protection position when a collision or a danger of a collision of the vehicle (2) is recognized and supporting an upper body of an occupant (I) of the vehicle seat (3) against a displacement caused by the collision by the table (4) in the occupant protection position.

* * * * *